United States Patent
Hutt et al.

(10) Patent No.: US 11,247,299 B2
(45) Date of Patent: Feb. 15, 2022

(54) PROTECTIVE GLASS WITH TRANSPONDER AND INSTALLATION AID AND ASSOCIATED LASER TOOL

(71) Applicant: TRUMPF LASER GMBH, Schramberg (DE)

(72) Inventors: Jochen Hutt, Schramberg (DE); Rainer Flaig, Eschbronn (DE); Gerhard Broghammer, Boesingen (DE); Michael Harteker, Rottweil (DE); Marius Hezel, Boesingen (DE); Matthias Fichter, Schramberg (DE); Bernhard Kaiser, Koenigsfeld (DE)

(73) Assignee: TRUMPF LASER GMBH, Schramberg (DE)

( * ) Notice: Subject to any disclaimer, the term of this patent is extended or adjusted under 35 U.S.C. 154(b) by 377 days.

(21) Appl. No.: 16/000,107

(22) Filed: Jun. 5, 2018

(65) Prior Publication Data

US 2018/0354079 A1  Dec. 13, 2018

(30) Foreign Application Priority Data

Jun. 8, 2017 (DE) .......................... 102017209696.9

(51) Int. Cl.
  *B23K 26/70* (2014.01)
  *B23K 26/03* (2006.01)
  (Continued)

(52) U.S. Cl.
  CPC ............ *B23K 26/706* (2015.10); *B23K 26/03* (2013.01); *B23K 26/0648* (2013.01); *B23K 26/1462* (2015.10); *B23K 26/702* (2015.10)

(58) Field of Classification Search
  CPC ................ B23K 26/702; B23K 26/706; B23K 26/1462; B23K 26/0648; B23K 26/03;
  (Continued)

(56) References Cited

U.S. PATENT DOCUMENTS

| 3,733,984 A | * | 5/1973 | Yata | ........................ | G03B 7/083 |
| | | | | | 396/238 |
| 4,104,649 A | * | 8/1978 | Tanaka | ..................... | G03B 7/20 |
| | | | | | 396/297 |

(Continued)

FOREIGN PATENT DOCUMENTS

| CN | 103717346 | 4/2014 |
| CN | 204524546 | 8/2015 |

(Continued)

OTHER PUBLICATIONS

CN Office Action in Chinese Appln. No. 201810585997.X, dated Jan. 18, 2021, 13 pages (with English translation).

(Continued)

*Primary Examiner* — Eric S Stapleton
(74) *Attorney, Agent, or Firm* — Fish & Richardson P.C.

(57) ABSTRACT

This disclosure relates to protective glass, for installation in laser tools of laser processing machines, comprising a transponder in which data relating to the protective glass are stored in a contactlessly readable fashion and/or can be contactlessly stored. A grip carrying the transponder is fastened as an installation aid directly on circumferential surface of the protective glass.

12 Claims, 2 Drawing Sheets

(51) Int. Cl.
*B23K 26/06* (2014.01)
*B23K 26/14* (2014.01)

(58) Field of Classification Search
CPC .. G02B 27/017; G02C 7/02; G06K 19/07749;
G06K 19/07762; H01Q 1/2225; H01Q
1/273; H01Q 1/38; H01Q 7/00
USPC .................................... 219/121.6; 340/572.7
See application file for complete search history.

(56) References Cited

U.S. PATENT DOCUMENTS

| | | | | |
|---|---|---|---|---|
| 4,241,251 A * | 12/1980 | Yonekubo | G02B 21/086 | 250/205 |
| 4,367,017 A * | 1/1983 | Jimbou | B23K 26/02 | 219/121.79 |
| 4,431,267 A * | 2/1984 | Finck | G02B 7/022 | 362/191 |
| 4,448,509 A * | 5/1984 | Katsuma | G03B 17/14 | 359/828 |
| 4,498,737 A * | 2/1985 | Doggett | G01B 5/25 | 359/641 |
| 4,499,897 A * | 2/1985 | Roussel | A61F 9/00821 | 219/121.74 |
| 4,531,816 A * | 7/1985 | Baumgartel | F16M 11/18 | 359/382 |
| 4,544,236 A * | 10/1985 | Endo | G02B 7/16 | 359/814 |
| 4,555,620 A * | 11/1985 | Bridson | G02B 21/0096 | 250/205 |
| 4,653,878 A * | 3/1987 | Nakasato | G02B 21/26 | 359/381 |
| 4,682,871 A * | 7/1987 | Metabi | G03B 7/20 | 396/236 |
| 4,684,780 A * | 8/1987 | Cantello | B23K 26/02 | 219/121.74 |
| 4,728,771 A * | 3/1988 | Sartorio | B23K 26/02 | 219/121.72 |
| 4,732,450 A * | 3/1988 | Lee | G02B 6/4296 | 385/33 |
| 4,999,659 A * | 3/1991 | Fukahori | G03B 17/14 | 396/532 |
| 5,208,439 A * | 5/1993 | Arai | B23K 26/08 | 219/121.74 |
| 5,229,572 A * | 7/1993 | Ito | B23K 26/067 | 219/121.67 |
| 5,249,082 A * | 9/1993 | Newman | G02B 7/028 | 359/813 |
| 5,559,370 A * | 9/1996 | Berney | G06K 19/048 | 257/679 |
| 5,584,568 A * | 12/1996 | Corbasson | F21V 14/06 | 359/794 |
| 5,679,944 A * | 10/1997 | Cusey | G06K 19/07 | 235/492 |
| 5,684,644 A * | 11/1997 | Spears | G02B 7/021 | 359/823 |
| 5,703,714 A * | 12/1997 | Kojima | G02B 21/06 | 250/201.3 |
| 5,723,854 A * | 3/1998 | Berney | G06K 7/1097 | 235/491 |
| 5,737,134 A * | 4/1998 | Watanabe | G02B 21/248 | 359/381 |
| 6,018,631 A * | 1/2000 | Taniguchi | G02B 7/282 | 396/529 |
| 6,118,527 A * | 9/2000 | Jurca | B23K 26/707 | 219/121.6 |
| 6,166,868 A * | 12/2000 | Holderer | G02B 7/026 | 359/819 |
| 6,215,604 B1 * | 4/2001 | Hori | G02B 7/02 | 359/819 |
| 6,370,171 B1 * | 4/2002 | Horn | B23K 26/702 | 372/29.01 |
| 6,538,232 B2 * | 3/2003 | Lambert | B23K 26/1435 | 219/121.84 |
| 6,560,045 B1 * | 5/2003 | Schletterer | G02B 7/026 | 359/818 |
| 6,809,860 B2 * | 10/2004 | Stenzel | G02B 21/248 | 359/368 |
| 6,928,100 B2 * | 8/2005 | Sato | G02B 7/025 | 359/718 |
| 7,057,162 B2 * | 6/2006 | Rentzsch | G02B 21/248 | 250/231.13 |
| 7,099,090 B2 * | 8/2006 | Daikoku | G02B 7/022 | 359/719 |
| 7,162,140 B2 * | 1/2007 | Flaig | G01N 21/15 | 356/237.1 |
| 7,193,700 B2 * | 3/2007 | Fliss | G01M 11/005 | 356/239.2 |
| 8,031,224 B2 * | 10/2011 | Linsenmaier | G03B 17/18 | 348/118 |
| 8,377,805 B2 * | 2/2013 | Tanabe | H01L 29/66757 | 438/487 |
| 8,445,815 B2 * | 5/2013 | Lambert | B23K 26/702 | 219/121.61 |
| 8,519,849 B2 * | 8/2013 | Ross-Messemer | G02B 27/017 | 340/572.1 |
| 8,591,105 B2 * | 11/2013 | Weick | G01K 17/003 | 250/338.4 |
| 9,182,580 B1 * | 11/2015 | Clawges | G02B 21/0016 | |
| 9,217,855 B1 * | 12/2015 | Clawges | G02B 21/0016 | |
| 9,393,643 B2 * | 7/2016 | Weick | B23K 26/03 | |
| 9,418,321 B1 * | 8/2016 | Gruda | G06K 15/00 | |
| 9,599,804 B2 * | 3/2017 | Birk | G02B 21/008 | |
| 10,054,423 B2 * | 8/2018 | Shafir | G01N 21/956 | |
| 10,222,602 B2 * | 3/2019 | Steinborn | G02B 21/245 | |
| 10,386,621 B2 * | 8/2019 | Harke | G02B 21/16 | |
| 2002/0003132 A1 * | 1/2002 | Scalzotto | B23K 26/0884 | 219/121.78 |
| 2002/0018733 A1 * | 2/2002 | Kapplein | G01N 1/31 | 422/64 |
| 2002/0088783 A1 * | 7/2002 | Weber | B23K 26/034 | 219/121.78 |
| 2003/0095345 A1 * | 5/2003 | Yoshida | G03F 7/70825 | 359/819 |
| 2003/0123160 A1 * | 7/2003 | Zeller | G02B 7/182 | 359/819 |
| 2004/0008342 A1 * | 1/2004 | Hutt | B23K 26/702 | 356/239.1 |
| 2004/0023087 A1 * | 2/2004 | Redmond | H01M 8/04208 | 429/515 |
| 2004/0125438 A1 * | 7/2004 | Studer | G02B 21/24 | 359/368 |
| 2005/0004921 A1 * | 1/2005 | Beenau | G06Q 40/02 | |
| 2005/0279741 A1 * | 12/2005 | Arenberg | B23K 26/702 | 219/121.83 |
| 2006/0043077 A1 * | 3/2006 | Nittner | B23K 26/702 | 219/121.75 |
| 2006/0189034 A1 * | 8/2006 | Tanabe | H01L 29/78675 | 438/117 |
| 2006/0240647 A1 * | 10/2006 | Mitsuhashi | H01L 21/67253 | 438/487 |
| 2007/0115542 A1 * | 5/2007 | Hashimoto | G02B 21/365 | 359/368 |
| 2007/0291379 A1 * | 12/2007 | Lambert | B23K 26/702 | 359/819 |
| 2008/0048863 A1 * | 2/2008 | Copeland | G08B 13/2431 | 340/572.1 |
| 2008/0068177 A1 * | 3/2008 | Copeland | G08B 13/2437 | 340/572.7 |
| 2008/0218355 A1 * | 9/2008 | Downie | H04B 10/2575 | 340/572.7 |
| 2009/0181518 A1 * | 7/2009 | Omata | H01L 21/187 | 438/455 |
| 2009/0212953 A1 * | 8/2009 | Ross-Messemer | G02C 7/02 | 340/572.7 |
| 2010/0296546 A1 * | 11/2010 | Weick | H01L 27/146 | 374/137 |

(56) References Cited

U.S. PATENT DOCUMENTS

| | | | | |
|---|---|---|---|---|
| 2011/0069379 A1* | 3/2011 | Becker | ................ | G02B 21/248 |
| | | | | 359/368 |
| 2014/0183175 A1 | 7/2014 | Weick et al. | | |
| 2015/0045734 A1* | 2/2015 | McLoughlin | ..... | A61M 5/14546 |
| | | | | 604/154 |
| 2015/0221242 A1* | 8/2015 | Cable | ........................ | G09F 7/04 |
| | | | | 40/661.01 |
| 2015/0345934 A1* | 12/2015 | Shafir | ................ | G01N 21/4738 |
| | | | | 356/364 |

FOREIGN PATENT DOCUMENTS

| | | |
|---|---|---|
| CN | 205587836 | 9/2016 |
| CN | 106475687 | 3/2017 |
| DE | 10055534 | 5/2002 |
| DE | 102004048099 | 4/2006 |
| DE | 202005021628 | 1/2009 |
| DE | 202009001270 | 4/2009 |
| DE | 102011078359 | 1/2013 |
| DE | 102011121697 | 6/2013 |
| DE | 102015200263 | 7/2016 |
| DE | 102015107556 | 9/2016 |
| DE | 102015223884 | 6/2017 |
| JP | 2003-43374 | 2/2003 |

OTHER PUBLICATIONS

DE Office Action in German Appln. No. 102017209696.9, dated Jul. 25, 2019, 16 pages (with English translation).

\* cited by examiner

PROTECTIVE GLASS WITH TRANSPONDER AND INSTALLATION AID AND ASSOCIATED LASER TOOL

CROSS REFERENCE TO RELATED APPLICATIONS

This application claims priority from German Application No. DE 10 2017 209 696.9, filed on Jun. 8, 2017, the contents of which is incorporated herein by reference in its entirety.

TECHNICAL FIELD

The invention relates to protective glass, for installation in laser tools of laser processing machines.

BACKGROUND

DE 10 2011 078 359 A1 discloses a protective glass for a laser tool.

Laser tools (laser processing head) of laser processing machines usually comprise focusing optics for focusing the laser beam directed onto a workpiece, and a protective glass arranged in front of the focusing optics to protect the focusing optics against contamination by the particles and vapors generated during the workpiece processing. During installation in the laser tool, the protective glass is held with the fingers and placed in a protective glass holder of the laser tool, but should be positioned in the glass holder without contaminating the protective glass with fingerprints.

DE 10 2011 078 359 A1 discloses arranging a transponder on an optical element of the laser processing machine in which transponder data relating to the optical element are stored, i.e. for example relating to the history and the state of contamination. The transponder, for example an RFID tag, is applied on an area of the optical element that is optically unused during operation of a laser processing machine, or an area that is not reached by the laser beam, and it can be written to and read from without mechanical contacting. In the case of a protective glass, for example, the allowable wavelength range, the current degree of contamination, the length of use and a range of other parameters of the protective glass can be stored in the transponder, and therefore directly assigned to the protective glass in question.

SUMMARY

The present disclosure relates to protective glass for laser tools and methods of using protective glass that help prevent contamination of the protective glass during installation in the laser tools. In one aspect, the protective glass systems ensure that a protective glass with its transponder is oriented correctly with respect to a write/read unit of the laser tool during installation in the laser tool.

In certain aspects a grip carrying the transponder is fastened, for example adhesively bonded, as an installation aid directly on the protective glass. The grip is bonded on the circumferential surface in particular implementations. In certain implementations, the grip protrudes radially outward from the protective glass, in particular from its circumferential surface, or from an edge of the glass.

The grip is used both as an installation aid, which makes direct holding of the protective glass superfluous, and as a carrier for the transponder. The protective glass can be installed using the grip without touching the glass itself, and therefore can be installed free from fingerprints. Furthermore, the transponder applied on the grip is optically of greater quality than an RFID tag merely bonded adhesively onto the protective glass.

The transponder can be fastened externally on one of the two sides of the grip, or be housed or framed in the grip. In the latter case, the grip then simultaneously forms the housing of the transponder, which is additionally protected by the housing.

In certain implementations, the grip includes encoding, in particular mechanical or visual encoding, as an orientation aid for correctly positioning the protective glass during installation for the correct alignment of the transponder with respect to a write/read device of the laser tool. Besides correct alignment of the transponder with respect to the write/read device, the encoding prevents installation of the protective glass the wrong way round. This would be the case, for example, if the possibly already contaminated side of the protective glass faced in the direction of the focusing optics. The contaminant particles would thus be able to reach the focusing optics unimpeded, and damage the latter. Mechanical encoding can be formed by an asymmetric outer contour of the grip, for example, by a chamfered corner of the grip, or by fastening, which is off-centered in the thickness direction of the protective glass, of the grip on the circumferential surface of the protective glass. In the simplest case, visual encoding can be produced by a marking, applied only on one of the two sides of the grip, which denotes the correctly positioned installation side.

In particular implementations, the grip is dimensioned in such a way that an operator can hold it with only the thumb and index finger. To this end, it is sufficient for the width of the grip in the circumferential direction of the protective glass to be at least 5 mm and at most 30 mm.

In some implementations, the grip is formed by a frame of the protective glass, which frames the circumferential surface of the protective glass and can advantageously be formed by an injection-molded plastic part, in which both the protective glass and the transponder are respectively integrated or embedded as inserted parts. In this case, the transponder is fully protected by the frame.

In another aspect, the invention relates to protective glass cassettes having a reception opening and comprising a protective glass configured as above, which is fitted into the reception opening. The reception opening has an edge recess for the grip fastened on the protective glass. In particular implementations, the edge recess has an asymmetric contour, in particular a chamfered corner, corresponding to an asymmetric outer contour of the grip, so as to ensure correct positioning of the protective glass during installation in the reception opening.

Other aspects of the invention relate to laser tools of laser processing machines. The laser tools include at least one protective glass cassette configured as above, which is installed in the beam path of a laser beam, and comprising at least one read and/or write device for contactless data exchange with the transponder of the protective glass of the at least one installed protective glass cassette. The protective glass, or the protective glass cassette, is usually arranged on the end of the laser tool facing towards the workpiece, to protect focusing optics against the particles and vapors generated during the workpiece processing. In particular implementations, the laser tool has a scattered-light measuring apparatus for monitoring the protective glass of the at least one installed protective glass cassette in respect of contamination.

In some implementations, at least two protective glass cassettes are installed behind one another in the beam path of the laser beam, with one protective glass, facing away from the workpiece, being used to protect focusing optics while the user is replacing the other protective glass facing towards the workpiece, and as a reference object for the scattered-light measurement. Advantageously, the protective glasses of the at least two installed protective glass cassettes are respectively assigned a read and/or write device, or are assigned a single shared read and/or write device, for contactless data exchange with the transponders of the protective glasses, and a shared scattered-light measuring apparatus for monitoring the protective glasses in respect of contamination.

Further advantages and advantageous configurations of the subject matter of the invention can be found in the description, the claims and the drawing. Likewise, the features mentioned above and those referred to below may be used independently, or several of them may be used in any desired combinations. The embodiments shown and described are not to be interpreted as an exhaustive list, but rather have an exemplary nature for the description of the invention.

DETAILED DESCRIPTION

Figure 1:
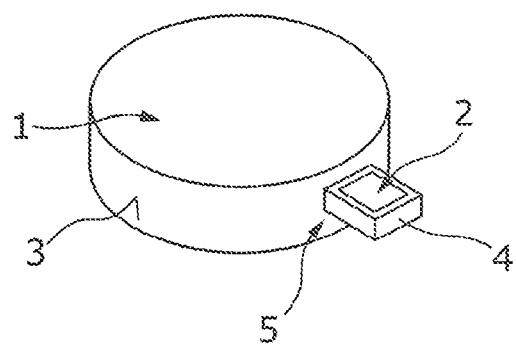
FIG. 1 shows a first example of an embodiment of a protective glass according to the invention.

The round protective glass 1 shown in FIG. 1 is used for installation in a laser tool 10 (FIG. 2) of a laser processing machine, and has a transponder, e.g., an RFID transponder, 2 in which data relating to the protective glass 1 are stored contactlessly in a readable fashion and/or can be contactlessly stored. A grip 4 carrying the transponder 2 is fastened, for example, adhesively bonded, laterally, as an installation aid directly on the protective glass 1, more precisely, on its circumferential surface 3. This grip 4 is dimensioned in such a way that an operator can hold it between the thumb and index finger, and can be formed by a lug protruding radially outwards from the circumferential surface 3, the width of which in the circumferential direction of the protective glass 1 is up to about 10 mm.

The transponder 2 can be fastened externally on one of the two sides of the grip 4, or housed or framed in the grip 4. In the latter case, the grip then simultaneously forms the housing of the transponder 2.

The grip 4 is not arranged centrally in the thickness direction of the protective glass 1 on the circumferential surface 3, but is placed closer to the upper protective glass side in FIG. 1 than to the lower protective glass side. This off-centered arrangement of the grip 4 in the thickness direction constitutes mechanical encoding 5 as an orientation aid for correctly positioning the protective glass 1 upon installation. As an alternative or in addition, the grip 4 can also be provided with a visual indication of the installation side.

Figure 2:
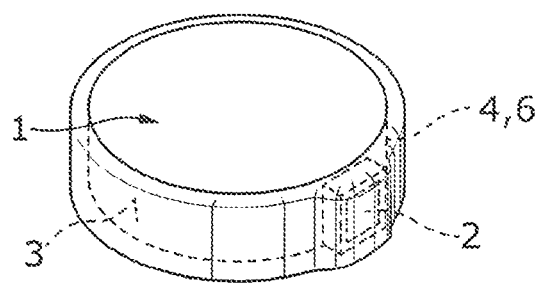
FIG. 2 shows a second example of an embodiment of a protective glass according to the invention.

In the protective glass 1 shown in FIG. 2, the grip 4 is configured as an annular frame 6 that frames the circumferential surface 3 of the protective glass 1, and is formed by an injection-molded plastic part in which both the protective glass 1 and the transponder 2 are integrated as inserted parts.

Figure 3:
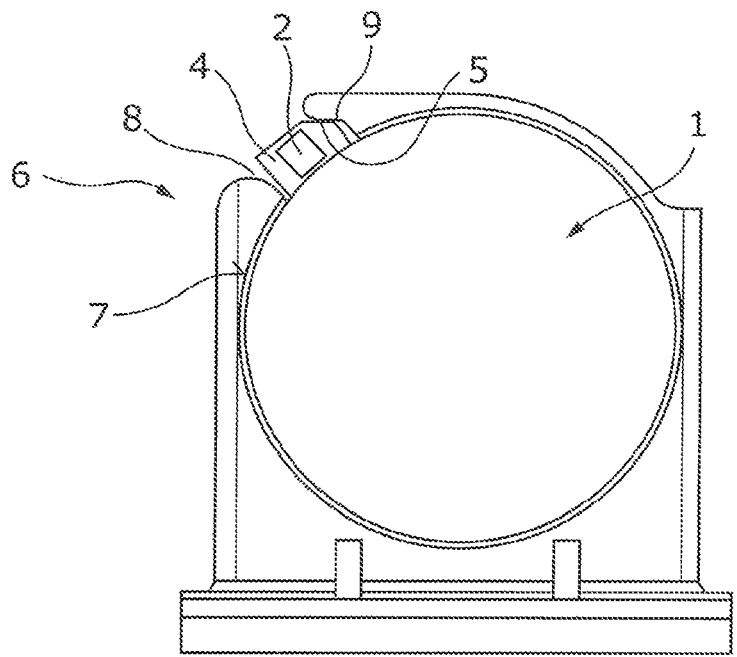
FIG. 3 shows a protective glass cassette having a protective glass according to the invention placed therein.

FIG. 3 shows a protective glass cassette 6 having an upwardly open round reception opening 7, into which a protective glass 1 having mechanical encoding 5 modified in relation to FIG. 1 is placed from above with the aid of the grip 4. For the radially outwardly protruding grip 4, the reception opening 7 has an edge recess 8. The mechanical encoding 5 is formed by an asymmetric contour of the grip 4, here by a chamfered corner of the grip 4, which cooperates with a correspondingly asymmetric contour of the edge recess 8, here with a chamfered corner 9 of the edge recess 8. The chamfered corner 9 of the grip 4, in cooperation with the chamfered corner 9 of the edge recess 8 in the protective glass cassette 6, ensures that the protective glass 1 can be placed in the protective glass cassette 6 only with its correctly installation side towards the protective glass cassette 6 and only in the correct angular rotation position.

Figure 4:
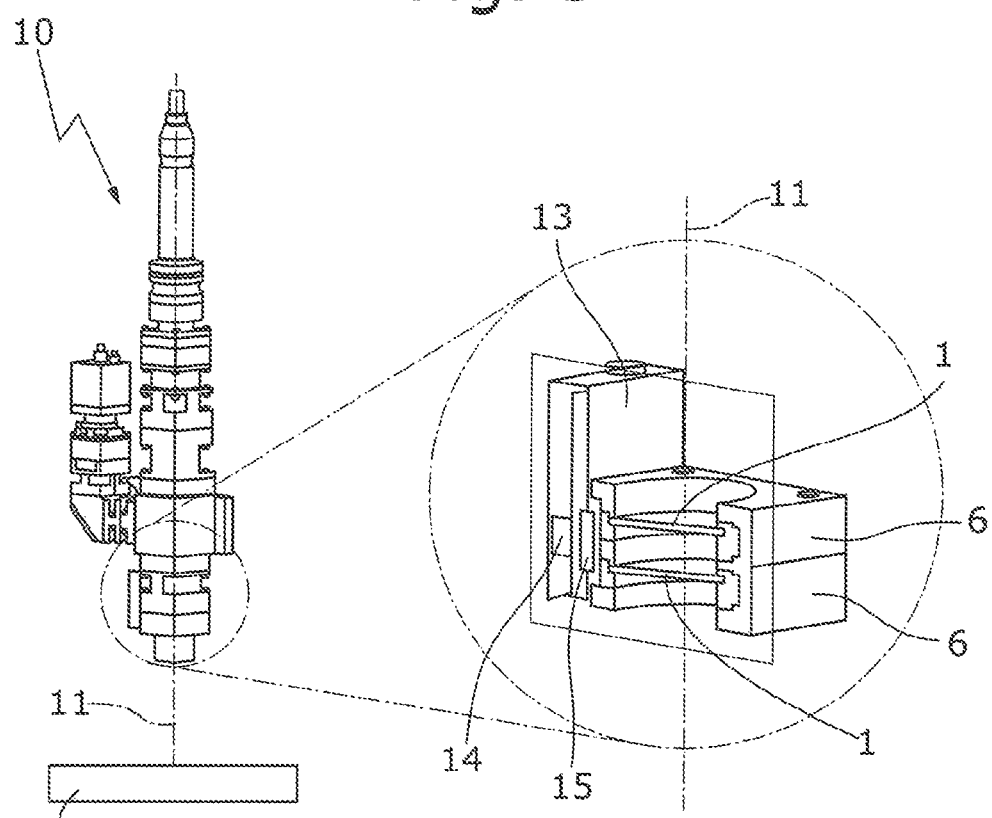
FIG. 4 shows by way of example a laser tool having two protective glass cassettes, in each of which is placed a protective glass according to the invention.

The laser tool 10 (laser processing head) shown in FIG. 4 transports and focuses a laser beam 11, which comes via a glass fiber from a laser source, onto a workpiece 12 by means of focusing optics (not shown here). To protect the focusing optics against the particles and vapors generated during the workpiece processing, the laser tool 10 has two protective glass cassettes 6, each with a protective glass 1, installed above one another in the beam path of the laser beam 11 at its end facing towards the workpiece. The protective glass cassettes 6 with their inserted protective glasses 1 are fitted into cassette compartments (not shown in detail here) of the laser tool 10. A read and/or write device 14 for contactless data exchange with the transponders 2 of the two installed protective glasses 1, and a scattered-light measuring apparatus 15 for monitoring the two installed protective glasses 1, are accommodated on a contact block 13 of the laser tool 10. By means of the read and/or write device 14, the data stored in the transponders 2 can be read out and data (for example, the current degree of contamination of the protective glasses 1) can be written back into the respective transponders 2. The upper protective glass 1 in FIG. 3 is used on the one hand to protect the focusing lens while the user is replacing the lower protective glass 1, and on the other hand as a reference object for the scattered-light measurement.

The mechanical encoding 5 of the protective glass 1, in cooperation with a corresponding counter-recess in the protective glass cassettes 6, ensures that the protective glasses 1 are installed in the laser tool 10 with their correct installation side towards the laser tool 10 and in the correct angular rotation position, and are therefore oriented correctly with respect to the read and/or write device 14.

What is claimed is:

1. A laser tool of a laser processing machine, comprising
   (a) at least one protective glass, wherein the protective glass comprises
       a circumferential edge;
       a grip protruding radially outwardly from the circumferential edge of the protective glass and coupled directly to the circumferential edge of the protective glass as an installation aid; and
       a transponder positioned on or within the grip,
       wherein the transponder is configured to store data relating to the protective glass in a contactlessly readable fashion, and wherein the grip comprises a mechanical encoding configured as an orientation aid for correctly positioning the protective glass during installation in the laser tool;

(b) at least one cassette for the protective glass installed in a beam path of a laser beam, wherein the cassette comprises a reception opening into which the protective glass is fitted, wherein the cassette for the protective glass comprises an edge recess in the reception opening configured to receive the grip coupled to the circumferential edge of the protective glass, and wherein the edge recess has an asymmetric contour comprising a chamfered corner, corresponding to an asymmetric outer contour of the grip, wherein the mechanical encoding of the grip is asymmetric to prevent an incorrect installation of the protective glass and is configured to cooperate with the reception opening in the cassette, and wherein the mechanical encoding is formed by the asymmetric outer contour of the grip, which is asymmetric with respect to turning the protective glass upside down, when seen from a top view of the protective glass; and (c) at least one write/read device configured to write or read data, or both write and read data for contactless data exchange with the transponder of the protective glass of the at least one installed cassette.

2. The laser tool of claim 1, comprising two cassettes corresponding to the at least one cassette, wherein the two cassettes are installed in series in the beam path of the laser beam.

3. The laser tool of claim 2, further comprising two protective glasses corresponding to the at least one protective glass and two write/read devices corresponding to the at least one write/read device, wherein each of the two cassettes comprises one of the two protective glasses, wherein the two protective glasses are respectively assigned to one of the two write/read devices for contactless data exchange with the respective transponders of the two protective glasses.

4. The laser tool of claim 3, wherein the two protective glasses of the at least two installed cassettes are assigned a common scattered-light measuring apparatus for monitoring the two protective glasses.

5. The laser tool of claim 2, further comprising two protective glasses corresponding to the at least one protective glass and a single write/read device corresponding to the at least one write/read device, wherein each of the two cassettes comprises one of the two protective glasses, wherein the two protective glasses are assigned to the single write/read device for contactless data exchange with the respective transponders of the two protective glasses.

6. The laser tool of claim 1, wherein the transponder is an RFID transponder.

7. The laser tool of claim 1, wherein the grip comprises a housing of the transponder.

8. The laser tool of claim 1, wherein the asymmetric outer contour of the grip comprises a chamfered corner of the grip.

9. The laser tool of claim 1, wherein the width of the grip in the circumferential direction of the protective glass is in the range of 5 mm-30 mm.

10. The laser tool of claim 1, wherein the grip is adhesively bonded on the circumferential edge of the protective glass.

11. The laser tool of claim 1, wherein the grip comprises a frame framing the circumferential edge of the protective glass.

12. The laser tool of claim 11, wherein the frame is formed by an injection-molded plastic part, into which both the protective glass and the transponder are integrated.

* * * * *